Sept. 30, 1969     C. T. HUTCHENS     3,469,860

SPRING MOUNTING

Filed July 21, 1967     2 Sheets-Sheet 2

INVENTOR
*CHARLES T. HUTCHENS*
BY *Cushman, Darby & Cushman*
ATTORNEYS 3,469,860
SPRING MOUNTING
Charles T. Hutchens, Springfield, Mo., assignor to Hutchens and Son Metal Products, Inc., Springfield, Mo., a corporation of Missouri
Filed July 21, 1967, Ser. No. 655,119
Int. Cl. B60g 11/04, 11/10
U.S. Cl. 280—104.5                                                    5 Claims

ABSTRACT OF THE DISCLOSURE

An assembly for suspending a vehicle frame on a pair of wheeled tandem axles in which the axles are connected with the central portions of leaf springs by means of pads of resilient material bonded between the axle and leaf spring so as to permit a limited resilient pivotal movement of the axle with respect to the spring occasioned by brake application to the wheels of the axles so as to more evenly distribute the braking forces to the ends of the springs connected with the vehicle frame and thereby eliminate brake hopping.

---

Figure 1:
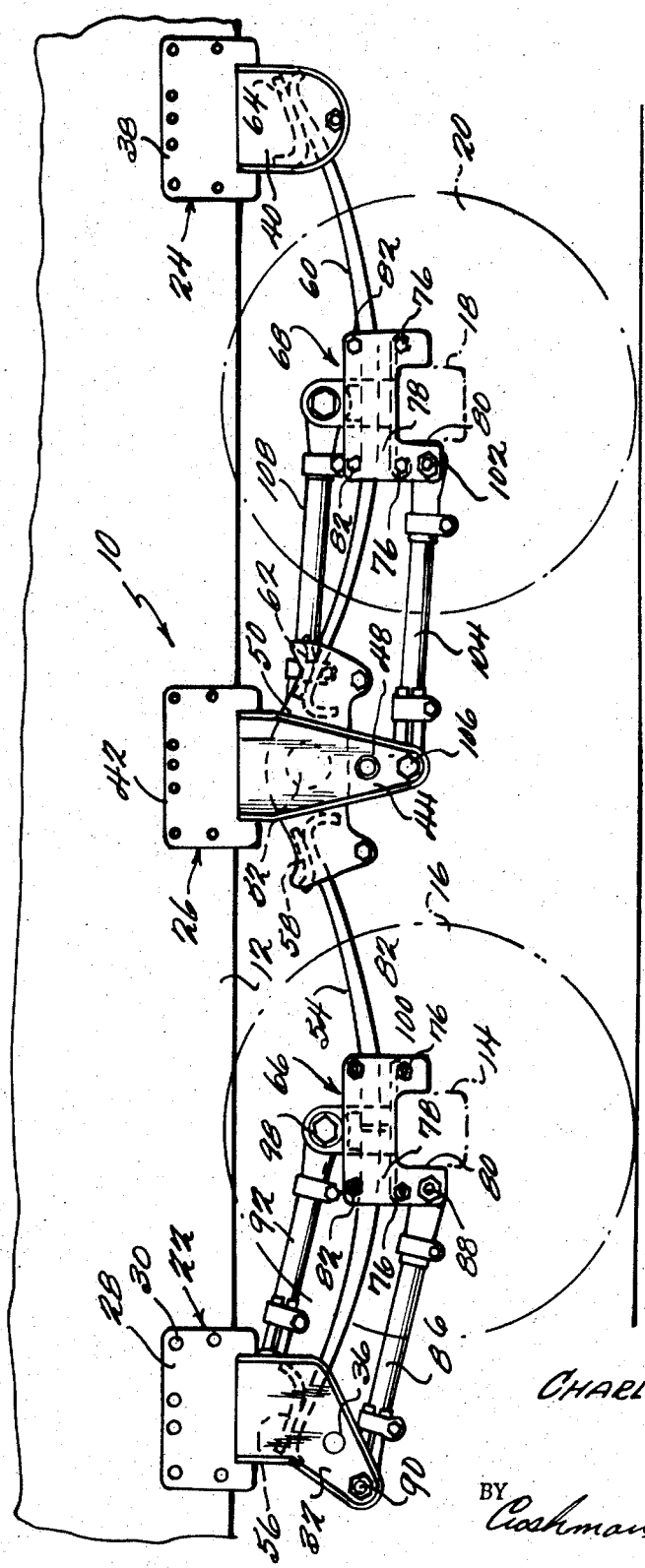

This invention relates to vehicle suspensions and more particularly to an assembly for suspending a vehicle frame on a pair of wheeled tandem axles.

Tandem axle suspensions of the type disclosed in U.S. Patent No. 2,577,322 are in widespread use. In general, these suspensions have performed satisfactorily. However, under certain conditions of brake application, suspensions of this type give rise to a phenomenon referred to in the art as "brake hopping."

In the conventional suspension, the leaf springs, which are connected at their central portions with the axles, have their ends disposed in sliding engagement with the hangers fixed to the vehicle frame or to the equalizer rocker arms. The torque forces, which are set up as a result of brake application and tend to rotate the axles about their axes, are thus directly transmitted to the springs, tending to unload the front ends thereof and to overload the rear ends thereof. This condition results in an undesirable pivotal movement of the equalizer arms which support the rear ends of the forward springs and the front ends of the rearward springs. When this undesirable rocking action of the equalizer arms takes place, the axles tend to be moved vertically and, under severe conditions, the wheels may hop off of the road surface.

There have been many proposals to modify the conventional suspension to alleviate brake hopping. For example, brake hopping has been alleviated by changing the pivotal connection of the torque arms with respect to the axles so that the axis of the pivotal connection is disposed substantially below the horizontal plane of the axes of the axles, rather than in horizontal alignment therewith or slightly thereabove. Moreover, it has been found that brake hopping can be substantially alleviated simply by effecting this change of the axis of the pivotal connection between the rear torque arms and the rear axle only.

Where the conventional suspension is modified to change the pivotal axes of the torque arms with respect to the axles, it is necessary to provide brackets on the axles which extend outwardly and downwardly from the axle or axles. The effectiveness of this no-hop arrangement is dependent upon preventing a rotational movement of the axles by means of torque arms which must act through an effective lever arm of substantial distance measured between the axis of the axle and the axis of the pivotal connection between the torque arm and axle. Due to the existence of this effective lever arm, the brackets fixed to the axle or axles, which provide the pivotal connection to the rear end of the torque arms, must be of sturdy construction and consequently, these brackets add substantial weight and cost to the suspension assembly.

The present invention is based upon the underlying principle that the phenomenon of brake hopping can be alleviated by providing for a limited amount of resilient rotational movement of the axles with respect to the springs in response to brake application by means of resilient pads effectively between the springs and axles. In accordance with the principles of the present invention, the axles of the suspension assembly are connected with the springs so that torque forces applied to the axles, as by brake application, are transmitted to the springs through a body of resilient material which effectively prevents transmission of the peak torque forces from the axles to the springs.

Accordingly, it is an object of the present invention to provide a suspension assembly of the type described, having bonded resilient pad means for connecting the axles of the assembly to the associated leaf springs in a manner to eliminate the phenomenon of brake hopping, and which reduces the weight and expense heretofore required by the provision of depending brackets on the axle or axles for pivotal connection with the rear ends of the torque arms.

While the present invention is particularly applicable to tandem axle suspension assemblies, the particular axle-to-leaf-spring connecting means has applicability to single axle suspension assemblies as well. Thus, since the axle-to-spring connection of the present invention is such as to substantially reduce the transmission of peak torque forces from the axles to the springs, a more uniform distribution of forces from the axle to the vehicle frame through the ends of the spring is obtained which is desirable not only in tandem axle assemblies but single axle assemblies as well.

Accordingly, it is a further object of the present invention to provide a vehicle suspension assembly having an improved axle-to-spring connection means including a bonded, load bearing, pad of resilient material means which substantially reduces transmission of peak torque forces from the axle to the springs.

Another object of the present invention is the provision of a vehicle suspension assembly of the type described, which is simple in construction, effective in operation and economical to manufacture and maintain.

These and other objects of the present invention will become more apparent during the course of the following detailed description and appended claims.

The invention may be best understood with reference to the accompanying drawings wherein an illustrative embodiment is shown.

Figure 2:
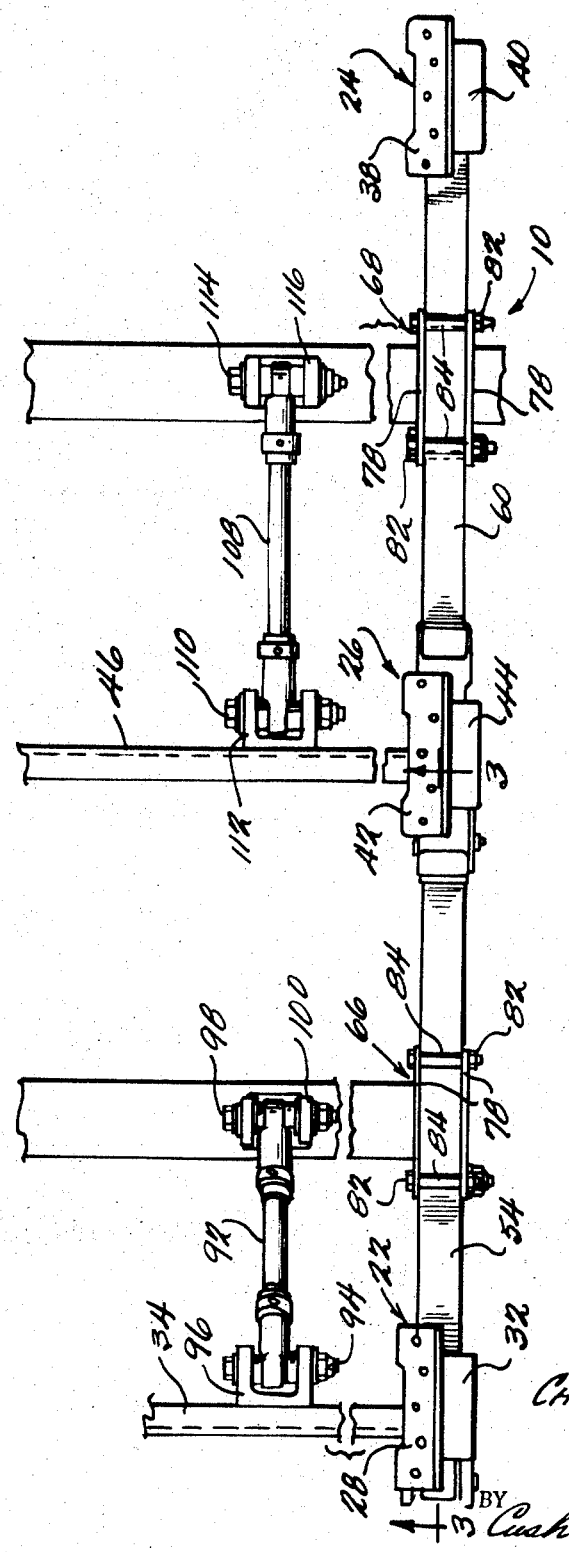
Figure 3:
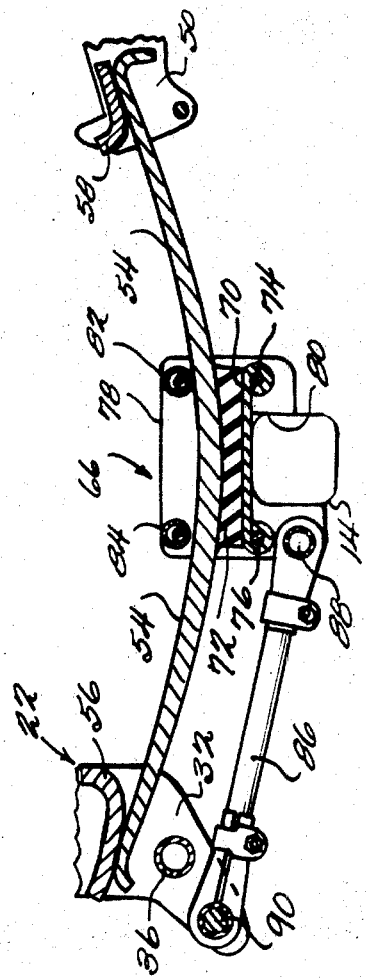

In the drawings:
FIGURE 1 is a side elevational view of a tandem axle suspension assembly embodying the principles of the present invention;
FIGURE 2 is a fragmentary top plane view of the suspension assembly shown in FIGURE 1; and
FIGURE 3 is a fragmentary sectional view taken along the line 3—3 of FIGURE 2.

Referring now more particularly to the drawings, there is shown in FIGURE 1 thereof a tandem axle suspension assembly, generally indicated at 10, embodying the principles of the present invention. The suspension assembly is shown as being mounted on a vehicle frame 12 forming a part of a conventional truck body of any suitable construction.

The suspension assembly 10, as shown, is of the tandem axle type providing a front axle 14 of conventional construction having front wheels 16 rotatably mounted on the ends thereof and a rear axle 18 of conventional construction having rear wheels 20 rotatably mounted on the ends thereof. It will be understood that the wheeled axles may be of any conventional construction, including the provision of convention brake assemblies (not shown) adapted to be actuated from the control cabin of the vehicle.

The suspension assembly 10 includes front, rear and intermediate hanger means, generally indicated by the numerals 22, 24 and 26, respectively. As shown, the three hanger means constitute three separate sub-assemblies, each of which is separately rigidly secured to the vehicle frame 12, although it will be understood that the three hanger means may be provided by a single rigid sub-assembly, as, for example, as shown in U.S. Patent No. 3,279,815 which is rigidly secured to the frame of the vehicle as a unit. As disclosed in the aforesaid patent, the rigid securement of the unit to the vehicle frame may be either a fixed rigid securement or a securement which permits the unit to be moved longitudinally with respect to the vehicle frame and fixed in any one of a plurality of longitudinally adjusted positions with respect thereto.

As shown, the front hanger means 22 comprises a pair of transversely spaced L-shaped mounting plates 28 positioned outwardly and beneath the side frame members of the vehicle frame 12 and rigidly secured thereto, as by bolt assemblies 30, welding or other suitable fastener means. Depending from each mounting plate and rigidly secured thereto is a pair of transversely spaced hanger plates 32.

As shown, the upper central portion of the inner hanger plate of each pair of hanger plates 32 is rigidly interconnected by a cross brace 34. As best shown in FIGURE 2, the cross brace 34 is of channel configuration and has its ends fixed, as by welding or the like, to the associated hanger plates. Spaced below the cross brace 34 is a tubular member 36, the end portions of which extend through suitable apertures in the associated hanger plates and are welded thereto. The end portions of the tubular member 36 thus serve to brace the lower end portions of each pair of hanger plates 32.

The rear hanger means 24, as shown, includes a pair of mounting plates 38, similar to the mounting plates 28 previously described, each mounting plate having a pair of transversely spaced hanger plates 40 rigidly secured thereto and extending downwardly therefrom in depending relation. A cross brace similar to the cross brace 34 may be provided between the inner plates of each pair of hanger plates 40 although in the arrangement as shown, such brace is eliminated.

The intermediate hanger means 26, as shown, is formed in a manner similar to the front hanger means 22 and includes a pair of L-shaped mounting plates 42, each having a pair of transversely spaced hanger plates 44 fixed thereto and extending downwardly in depending relation, a channel shaped cross brace 46 and a transversely extending tubular member 48.

Disposed between each pair of hanger plates 44 is an equalizer arm member 50 having its central portion pivotally mounted between the associated hanger plates by a pivot assembly 52. The pivot assembly may be of any suitable construction as, for example, an assembly of the disclosed in the aforesaid Hutchens Patent No. 3,279,815.

The suspension assembly 10 of the present invention also includes a pair of front leaf springs 54 mounted with their front ends in sliding abutting relation beneath wear plates 56 fixedly secured between the upper portion of the hanger plates 32 of the front hanger means. The rear ends of the front springs 54 are mounted in sliding abutting relation beneath wear plates 58 fixedly secured to the upper forward portion of the equalizer arm 50.

In a like manner, the present suspension assembly 10 also includes a pair of rear leaf springs 60 having their front ends connected with wear plates 62 fixedly secured at the upper rear ends of the equalizer arms and their rear ends slidably abutting rear wear plates 64 connected between the hanger plates 40 of the rear hanger means 24.

In accordance with the principles of the present invention, the leaf springs 54 and 60 are connected with the associated axles 14 and 18 by connecting means generally indicated at 66 and 68, respectively. Since both the front and rear connecting means 66 and 68, respectively, are of similar construction, a description of one will suffice to give a clear understanding of both. As best shown in FIGURE 3, the connecting means 66 includes a horizontally extending mounting plate 70 disposed below the central portion of each front spring 54. A body of resilient material 72 is bonded between the adjacent surfaces of each spring 54 and the associated mounting plate 70. In the preferred embodiment shown in FIGURE 3, the body of resilient material is formed of rubber, vulcanized in intimately bonded relation to the lower central surface of the associated spring 54 and the upper surface of the mounting plate 70. While the bonding of the body of resilient material is essential to the present invention to form a resilient pad capable of permitting a yielding relative movement between the springs and the axle in response to brake application to the latter, other means for effecting the bond may be utilized in lieu of in situ vulcanization of a body of rubber. For example, a pre-formed pad of resilient material could be solvent welded or otherwise intimately bonded between each spring and associated mounting plate.

In the preferred embodiment of the present invention, the springs of the suspension are shown to be of conventional single leaf spring design. This construction is preferred since heat generation is minimized thus minimizing heat damage to the bond between the leaf springs and the rubber pads. Nevertheless, while single leaf springs are preferred, it is within the contemplation of the present invention to utilize multi-leaf spring assemblies, in which case the rubber pad would either be bonded to the central portion of the lowermost leaf spring or to a plate fixedly connected beneath the central portion of the multi-leaf spring assembly.

Each mounting plate 70 is fixedly secured to the front axle by any suitable means. As shown, each mounting plate has its ends turned under to form eyes 74 for receiving a pair of mounting bolts 76. The ends of the mounting bolts 76 extend through suitable apertures formed in a pair of transversely spaced vertically extending parallel plates 78. The lower central portion of each pair of plates 78 is formed with a downwardly facing recess 80 adapted to receive therein the upper portion of the axle 14. Preferably, the vertical plates 78 are rigidly secured to the axle, as by welding or the like, although it will be understood that other fastening means may be provided for effecting the rigid securement of the plates to the axle.

The upper portion of each pair of vertical plates 78 is apertured to receive bolt assemblies 82 having spacers 84 mounted on the central portions thereof and disposed between the plates. The lower periphery of each spacer 84 is spaced slightly from the adjacent upper periphery of the springs. This relationship permits a limited relative pivotal movement of the plates 78 with the axle 14 about the axis of the latter, with respect to the springs, without transmitting such motion directly to the springs as would be the case with a rigid connection between the spacers and springs. The primary function of the spacers and bolt assemblies 82 is to rigidify the upper end portion of the vertical plates 78. The spacer arrangement further serves to limit the resilient relative pivotal action between the springs and the axle, although this function is not considered to be essential to the present invention.

The lower front end portion of each pair of vertical plates 78 extends downwardly a distance greater than the downward extension of the rear end portions thereof to receive therebetween the rear end of a front torque arm 86. As shown, the torque arm 86 is preferably of conventional adjustable construction and has its rear end pivotally connected to the associated pair of plates 78, as by pivot bolt 88, and its front end pivotally connected between the lower forward end portions of the hanger plates 32, as by a pivot bolt assembly 90.

A central stabilizing torque arm 92 is connected between the cross brace 34 of the front hanger means 22 and the front axle 14. Here again, the torque arm 92 is preferably of conventional adjustable design and has its front end connected, as by a pivot bolt assembly 94, to a U-shaped bracket 96 fixed, as by welding or the like, to the central portion of the cross brace 34. The rear end of the torque arm 22 is pivotally connected, as by a pivot bolt assembly 98, to a U-shaped bracket 100 fixedly secured, as by welding or the like, to the upper central portion of the axle 14.

It will be understood that the rear axle 14 is provided with a torque arm arrangement similar to that provided for the front axle 14. Thus, each of the vertical plates of the rear axle connecting means 68 is pivotally connected, as by a bolt assembly 102, with the rear end of a torque arm 104, the forward end of which is pivotally connected, as by a bolt assembly 106, between the lower ends of the hanger plates 44 of the associated intermediate hanger means 26.

A central rear stabilizer torque arm 108 is likewise provided which is pivotally connected at its front end, as of by pivot bolt assembly 110, to a bracket 112 fixedly secured to the central portion of the cross brace 46, and its rear end pivotally connected as by a pivot bolt assembly 114, to a bracket 116 fixedly secured to the upper central portion of the rear axle 18.

The utilization of the central stabilizer torque arms 92 and 108 is preferred in heavy truck installations. It will be understood however that these torque arms can be eliminated in lighter installations and particularly would not be necessary in trailer installations.

It can be seen that the suspension assembly 10 of the present invention will normally function in the manner of the conventional arrangement. An important operational advantage of the present invention is that peak torque forces generated within the axle as a result of brake application are absorbed or dampened through the yieldable connection provided by the bonded rubber pads 72 embodied in the connection means 66 and 68. With this arrangment, any rotational movement of the axles about their axes, permitted as a result of the more desirable conventional torque arm arrangement, is not immediately transmitted to the associated springs 54 and 60. On the contrary, such limited relative motion will result primarily in the flexure of the body of resilient material 72 itself bonded between each spring and mounting plate rigidly secured to the associated axle. In this way, the peak torque forces applied to the axles will not result in underloading the front ends of the associated springs and overloading the rear ends thereof. A much more uniform distribution of the load from the axles through the connection of the ends of the springs with the vehicle body is obtained.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

What is claimed is:

1. An assembly for suspending a vehicle frame on a pair of wheeled tandem axles comprising:
   means adapted to be rigidly secured to the vehicle frame providing longitudinally spaced front, rear and intermediate hangers depending from each side of the vehicle frame with hangers on opposite sides in transverse alignment,
   equalizer arm means pivotally carried by each of said intermediate hangers,
   a pair of transversely spaced longitudinally extending front leaf springs having their front ends operatively connected with the associated front hangers and their rear ends operatively connected with the associated equalizer arm means in forwardly spaced relation to the pivotal axis thereof,
   a pair of transversely spaced longitudinally extending rear leaf springs having their front ends operatively connected with the associated equalizer arm means in rearwardly spaced relation to the pivotal axis thereof and their rear ends operatively connected to the associated rear hangers,
   bracket means adapted to be rigidly secured to each axle and operatively connected with the cerebral portion of each spring, the bracket means associated with each spring including a pair of transversely spaced vertically extending plates adapted to be fixedly secured to the associated axle, a flat horizontal plate detachably fixedly secured between said pair of plates above the associated axle, said flat horizontal plate having an upwardly facing generally horizontally extending surface which along with means on the associated spring defines opposed surfaces fixed with respect to each spring and associated bracket means respectively,
   radius rod means operatively connected between said bracket means and said front and intermediate hangers providing means for transmitting longitudinal forces between the vehicle frame and axles while permitting relative vertical movement therebetween, and
   a body of resilient material bonded between each pair of said opposed surfaces providing a resilient load bearing connection permitting limited resilient pivotal movement of the axles with respect to the springs associated therewith occasioned by brake application to the wheels of the axles to thereby substantially reduce the transmission of peak torque forces to the springs and prevent brake hopping.

2. An assembly as defined in claim 1 wherein each of said springs comprises a single leaf spring having a generally horizontally extending downwardly facing central surface portion constituting the other of the associated opposed surfaces.

3. An assembly as defined in claim 2 wherein each body of resilient material comprises a generally horizontally extending pad of rubber vulcanized between the associated pair of opposed surfaces.

4. An assembly as defined in claim 1 wherein said radius rod means comprises a pair of front radius rods connected at their front ends to the lower ends of said front hangers for pivotal movement about a transverse horizontal axis and at their rear ends between the forward lower portions of the vertical bracket means plates associated with the front axle for pivotal movement about a transverse horizontal axis disposed generally in alignment with the pivotal axis of the front ends of said front radius rods and the axis of the front axle, and a pair of rear radius rods connected at their front ends to the lower ends of said intermediate hangers for pivotal movement about a transverse horizontal axis and at their rear ends between the forward lower portions of the vertical bracket means plates associated with the rear axle for pivotal movement about a transverse horizontal axis disposed generally in alignment with the pivotal axis of the front ends of said rear radius rods and the axis of the rear axle.

5. An assembly as defined in claim 4 wherein said front hangers include rigid wear plates defining downwardly facing surfaces longitudinally slidably receiving the front ends of said front springs, said rocker arm means include front and rear rigid wear plates defining longitudinally downwardly facing surfaces longitudinally slidably receiving the rear ends of said front springs and the front ends of said rear springs respectively, and said rear hangers include rigid wear plates defining downwardly facing surfaces longitudinally slidably receiving the rear ends of said rear springs.

References Cited
UNITED STATES PATENTS 3,157,412  11/1964  Frazier.
3,154,300  10/1964  Wenzel _____ 267—52 X PHILIP GOODMAN, Primary Examiner U.S. Cl. X.R.
267—52